(No Model.)

J. H. D'LAMATTER.
CULTIVATOR.

No. 265,765. Patented Oct. 10, 1882.

Witnesses.
A. A. Connolly
T. J. McTighe

Inventor.
James H. D'Lamatter,
By Connolly Bros.
Attorneys.

United States Patent Office.

JAMES H. D'LAMATTER, OF EARLVILLE, ILLINOIS.

CULTIVATOR.

SPECIFICATION forming part of Letters Patent No. 265,765, dated October 10, 1882.

Application filed June 30, 1882. (No model.)

*To all whom it may concern:*

Be it known that I, JAMES H. D'LAMATTER, a citizen of the United States, residing at Earlville, in the county of La Salle and State of Illinois, have invented certain new and useful Improvements in Cultivators; and I do hereby declare the following to be a full, clear, and exact description of the invention, reference being had to the accompanying drawings, which form part of this specification, in which—

Figure 1:
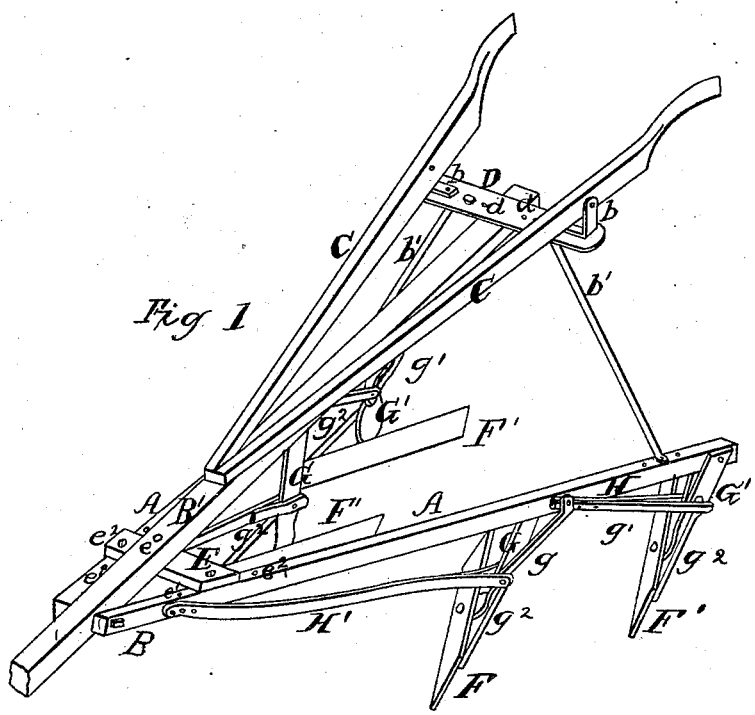
Figure 2:
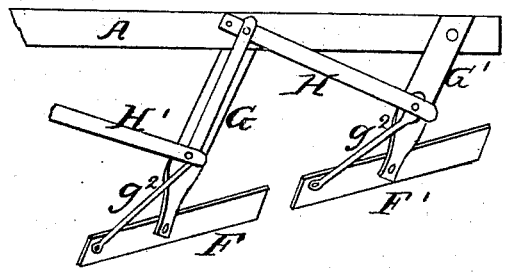

Figure 1 is a perspective view, and Fig. 2 a side view, of a cultivator embodying my improvements.

This invention has relation to cultivators of that class in which the main frame is composed chiefly of two bars united at their forward ends and diverging toward their rear ends.

The improvement consists in the novel construction and arrangement of parts.

Referring to the accompanying drawings, A A designate the two diverging bars which constitute the principal portion of the cultivator-frame. These bars are connected at their forward ends by a transverse bolt, B, which passes also through the tongue or draft-beam B', embraced by the bars A A. This bolt serves also as a pivot upon which the bars A A and beam B turn for the purposes of adjustment. The beam B' extends rearward and upward, and has attached to it the handles C C. A cross-bar, D, is secured to the beam B' at its rear end and holds standards $b\ b$, which support and brace the handles. From the under side of the cross-bar D diagonal braces $b'\ b'$ pass to the bars A A and form a connection between the draft-beam and frame at their rear ends.

E is a transverse bar, connecting the bars A A behind and underneath the beam B', and attached to the latter by a vertical pin, $e$. The bars A A have several holes each, as seen at $e'$, for the reception of the pins $e^2\ e^2$, which secure the bar E to bars A A at different points. The bar E is adjustable, and when moved toward the front or rear of the frame causes or allows the beam B' to be raised or lowered and the frame A A to be lowered or raised, according to the nature of the adjustment. The relative adjustment of the frame and draft-beam requires a corresponding adjustment of the braces $b'\ b'$, and to effect this the cross-bar D is pierced in several places, as shown at $d\ d$, for the reception of the bolts or pins which connect the bar and braces together.

F F' represent the cultivator-shares. These are made in the form of blades with parallel edges, or with the upper and lower edges of the rear set converging slightly toward their rear ends. The ends of these shares are cut off obliquely, producing points to enter the earth. The shares are in two or more sets, in accordance with the usual arrangement. Those in each set converge toward their rear ends, which are higher than their forward ends, and are set at an inclination outward from their lower edges. This arrangement allows the shares to work the soil easily and properly without extraordinary strain or roughness.

G G' are the share-standards, pivoted to the bars A A on opposite sides respectively.

$g\ g$ are braces extending from the lower part of each standard to the opposite side of the bar A to which said standard is attached.

$g^2\ g^2$ are braces connecting the points of the share and the lower portions of the standard.

H H' are braces, bifurcated at their rear ends, where they are attached to the standards, and thence extending forward and adjustably fastened to the bars A A. The braces H $g$ are fastened to the bars A by the same pins. The standards are made of flat iron, which is twisted to give the shares the proper obliquity and inclination. The shares are adjusted to regulate their pitch, &c., by moving the braces H H' lengthwise.

Having described my invention, I claim as new and desire to secure by Letters Patent—

1. The combination of the frame A and inclined central draft-beam, B', pivoted together and relatively adjustable with the cross-bar D and supporting standards or braces $b'\ b'$, substantially as described and shown.

2. The movable and adjustable cross-bar E and braces $b'\ b'$, in combination with the connected and relatively-adjustable frame A A and draft-beam B', substantially as described.

In testimony that I claim the foregoing I have hereunto set my hand this 22d day of June, 1882.

JAMES H. D'LAMATTER.

Witnesses:
JAMES S. RADLEY,
W. P. WARREN.